United States Patent [19]

Bassett et al.

[11] 4,440,179

[45] Apr. 3, 1984

[54] STONE TRAP FOR AN AXIAL FLOW ROTARY SEPARATOR

[75] Inventors: James H. Bassett, Davenport, Iowa; Timothy F. Christensen, East Moline; Mark L. Pearson, Moline, both of Ill.

[73] Assignee: Deere & Company, Moline, Ill.

[21] Appl. No.: 434,820

[22] Filed: Oct. 18, 1982

[51] Int. Cl.³ .......................... A01F 7/00; A01F 12/20; A01F 12/28
[52] U.S. Cl. .......................... 130/27 JT; 56/DIG. 15; 209/660; 209/668
[58] Field of Search ............... 209/621, 659, 660, 664, 209/667, 670, 689, 690, 261, 284, 288, 293, 300, 362, 666, 668; 130/27 T, 27 JT; 56/12.8, DIG. 15

[56] References Cited

U.S. PATENT DOCUMENTS

| | | | |
|---|---|---|---|
| 3,589,111 | 6/1971 | Gullickson et al. | 56/12.8 |
| 3,805,798 | 4/1974 | Girodat | 130/27 JT |
| 4,330,000 | 5/1982 | Peiler | 130/27 L |

*Primary Examiner*—David A. Scherbel
*Assistant Examiner*—Glenn Foster

[57] ABSTRACT

In an axial flow rotary separator, a transition zone between the infeed section and threshing sections is modified to serve as a stone trap or arresting and ejecting device. Radially aligned inner and outer stone collars carried by the separator rotor and casing respectively, obtrude into the annular space between rotor and casing to define between them an annular slot or gate, decreasing or limiting the annular space so as to arrest the downstream passage of stones greater than a predetermined size. The inside surface of the casing immediately upstream of the stone collars is smooth and free of guide vanes to provide a track over which arrested stones may be propelled by conveyor flights of the rotor. A permanently open outlet in the stone track allows the rotor to eject stones tangentially and centrifugally into a stone sump connected to the casing. The stone sump is easily emptied by opening a door accessible from outside the combine body wall.

40 Claims, 8 Drawing Figures

STONE TRAP FOR AN AXIAL FLOW ROTARY SEPARATOR

BACKGROUND OF THE INVENTION

This invention concerns foreign body rejection in mobile harvesters and, more particularly, rejection of non-frangible bodies such as stones or rocks in an axial flow rotary separator of the type which may be used in a combine harvester. For convenience, these undersirable foreign bodies will be referred to generically as stones.

Ingesting a stone may cause severe damage to internal members of a combine, especially high inertia portions such as the threshing mechanism. Control or rejection arrangements designed to limit the size or weight of stones reaching "critical" regions of the combine are well known. Practical considerations and harvesting economics dictate that some potentially damaging stones must be accepted into the gathering and feeding systems of the harvester but steps are taken to control or reject them before they reach critical processing areas of the machine.

Existing devices generally attempt to control or reject the stone either in the feeder house of the combine or, in conventional machines, no later than at the threshold of the concave, at the entry to the threshing zone. Releasable doors, set into the floor of the feeder house or concave threshold, may be associated with pressure sensitive or other stone detection devices calibrated and operable to permit the ejection from the crop material mat of stones exceeding acceptable limits. In another form of feeder house stone control, the floating of a lower portion of the feeder conveyor is restricted so that engagement of large stones by the (undershot) conveyor tends to jam the conveyor. A slip clutch in the conveyor drive system minimizes damage to the conveyor and its drive train.

Feeder house stone control arrangements of the types alluded to above are applicable to both so-called conventional combines and the more recently appearing so-called rotary combines (which include axial flow rotary separators). But all are of limited reliability and some are relatively complex and costly and may impose the inconveniences of resetting after each stone incident, or of frequent readjustment. No known devices take advantage of operating or functional characteristics peculiar to axial flow rotary separators.

SUMMARY OF THE INVENTION

Accordingly, it is an object of the present invention to provide a stone control arrangement for a combine harvester which is particularly suited to a machine equipped with an axial flow rotary separator and which makes use of functional characteristics peculiar to such separators, and also to provide a stone control arrangement which is reliable, simple in structure, relatively low in cost and convenient to service.

According to the invention, a restriction is created in the axial flow rotary portion of the combine material-handling system so that stones exceeding a predetermined size are prevented from proceeding through the system. Such stones may enter and be accommodated by an upstream portion of an axial flow rotary separator and at least begin to progress through the separator but are axially arrested at a point intermediate the inlet and outlet of the separator and preferably before reaching a particular processing section such as the threshing zone.

Preferably, the means for arresting the axial movement of the stone is a restriction or gate in the annular space between rotor and casing and may be in the form of an annular slot concentric with the rotor. It may be defined by an inner "live" collar carried by the rotor and/or a cooperating outer non-rotating collar carried by the rotor casing. Both collars obtrude into and reduce the annular space to define a particular annular slot, specific to a predetermined maximum acceptable stone size. In keeping with the invention, the annular slot may be made radially adjustable to suit particular operating conditions or requirements. Raised material control elements carried by the rotor may engage the arrested stone and propel it circumferentially as permitted by a substantially smooth stone track on the inner surface of the separator casing upstream of the annular gate. When the track is interrupted by an outlet opening in the casing, the rotor releases the stone tangentially and centrifugally, ejecting it from the separator. A sump or stone collecting box may be associated with the outlet to receive and hold the rejected stones.

In axial flow rotary separators, there is typically a reduction of the effective radial thickness of the annular space between material control elements carried by the rotor and separator casing at the transition from the infeed portion of the separator to the first processing (usually threshing) zone. Clearly, the mat of crop material must be attenuated as it enters the reduced thickness zone and it is a feature of the invention to associate with this existing convergence of rotor and casing, a particular annular restriction or impedance, effective to positively limit access to the processing zone by non-frangible bodies greater than a certain predetermined size but without substantially adversely affecting the material-handling capacity of the separator. Although the stone control device may be provided closely adjacent the inlet to the first processing zone, one or more generally helically arranged feed elements carried by the rotor may extend both upstream and downstream of the stone control restriction.

DESCRIPTION OF THE PREFERRED EMBODIMENT

The invention is embodied in the axial flow rotary separator of an otherwise generally conventional combine harvester. However, the drawings (FIGS. 1 and 2) show only the forward portion of the separator 10, rearward portion of the feeder house 12, and a stone sump or collecting box 14 extending between the separator and the body wall 16 of the combine.

Figure 1:
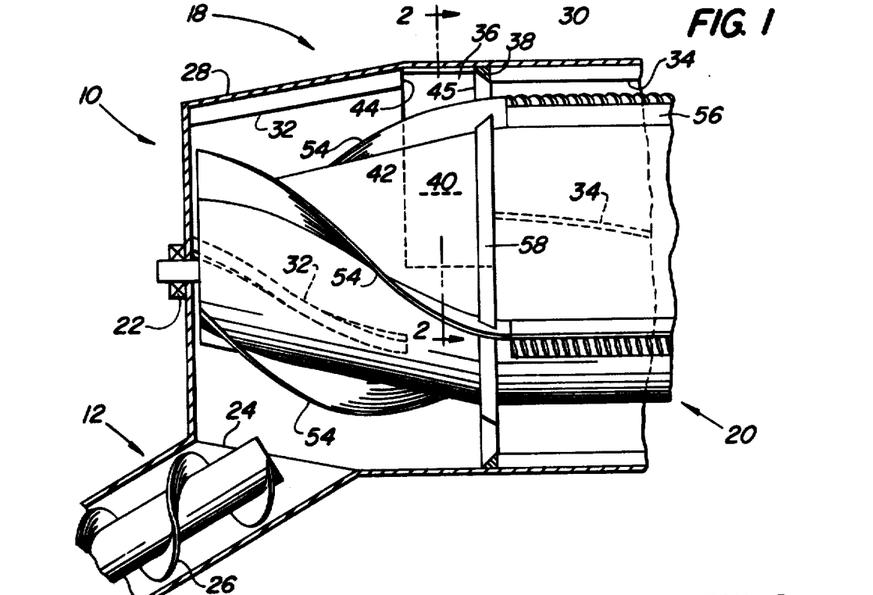
FIG. 1 is a semi-schematic partial left side view of the forward portion of an axial flow rotary separator embodying the invention, shown in cross section on a vertical plane through the longitudinal axis of the separator.
Figure 2:
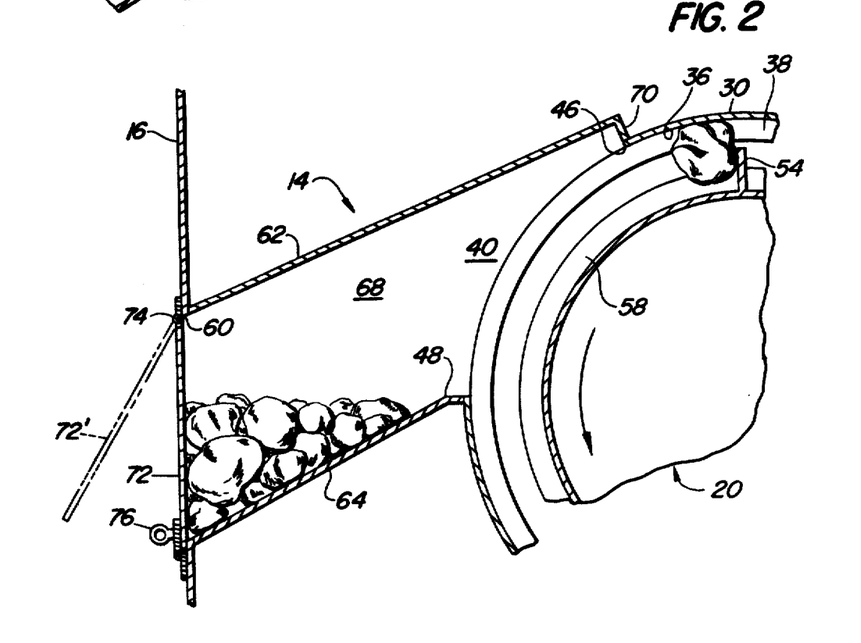
FIG. 2 is a somewhat enlarged partial front view taken approximately on line 2—2 of FIG. 1 and showing a stone collecting sump with an access door in the right-hand outer wall of the combine separator body.

In many respects, the separator 10 and feeder house 12 also are conventional, the casing 18 of the separator enclosing a rotor 20 rotatably and concentrically carried on bearings only the forward one 22 of which is shown. The feeder house 12 is connected to deliver gathered material undershot fashion into the separator through aninfeed opening 24, propelled by the dual augers 26 of the feeder house.

The separator casing 18 is differentiated into a largely frusto-conical infeed portion 28 and, downstream of it, a cylindrical processing portion 30. Conventional helically arranged guide vanes 32 and 34 are carried on the inside surfaces of the casing feed and processing portions 28 and 30 respectively. An unconventional aspect of the guide vane arrangement is the absence of vanes in an annular forward portion of the casing portion 30, defining a smooth circumferentially extending stone track 36. Marking the downstream edge of the track 36 and contiguous with the upstream ends of the processing guide vanes 34 is a continuous annular stone collar 38 carried by and concentric with the casing portion 30.

The stone track 36 is interrupted by an outlet opening 40 extending circumferentially in the right-hand upper quadrant of the separator and having an upstream edge 42 approximately circumferentially aligned with the downstream ends 44 of the feed guide vanes 32, a downstream edge 45 defined essentially by the casing stone collar 38 and, in terms of rotor rotation, leading and trailing edges 46 and 48 respectively.

The rotor 20 comprises feed and processing portions corresponding axially approximately with the respective feed and processing portions 28, 30 of the separator casing and including a frusto-conical body feed portion 50 and a cylindrical body processing portion 52. The rotor body feed portion 50 carries a set of circumferentially spaced helical feed flights 54 which substantially abut a similar number of threshing bars 56 carried by the rotor processing body portion 52. Adjacent the junction between the rotor body feed and processing portions 50 and 52, the rotor carries an annular concentric inner stone collar 58.

The stone collecting box or sump 14 may be regarded as a conduit extending outwards and downwards from the outlet 40 in the stone track 36 to an opening 60 in the wall 16 of the combine body. The box, of generally rectangular cross section, includes top and bottom walls 62 and 64 respectively, and upright front and rear walls 66 and 68 respectively. The top wall 62 is approximately tangential to the rotor casing portion 30 but is offset radially outwards and connected to the leading edge 46 of the outlet 40 by a short wall portion or step 70. The opening 60 in the combine body wall is closed by a door 72 hinged at its upper edge 74 to the body wall and secured by a latch 76 at its bottom edge.

Figure 3:
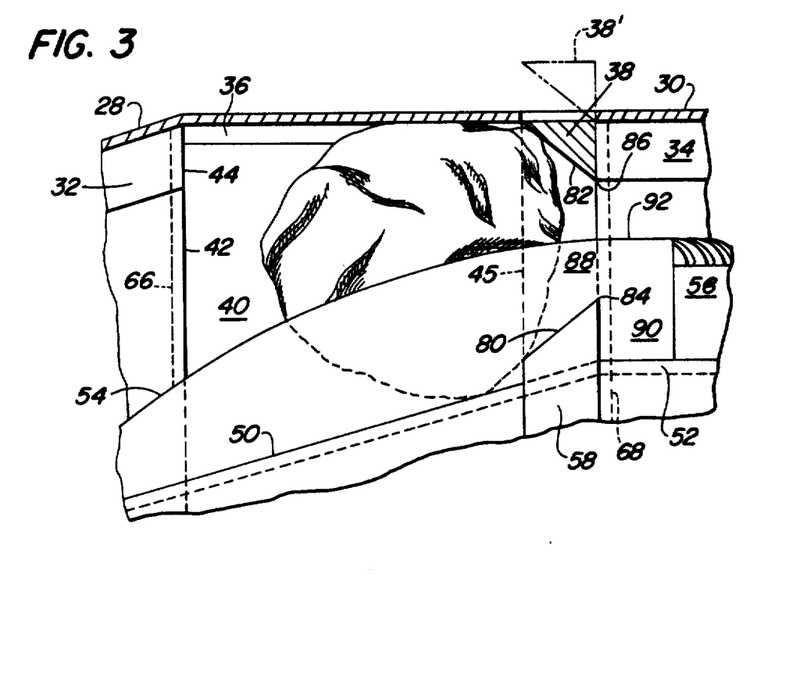
FIG. 3 is a further enlarged partial view taken from the upper portion of FIG. 1 and showing details of the stone control device with a stone arrested by the cooperating inner and outer annular collars.

Looking at the stone control arrangement in more detail and with particular reference to FIG. 3, it will be seen that the juxtaposed inner and outer stone collars 58 and 38 respectively, both have frusto-conical or chamfered faces 80, 82, converging rearwardly to radially aligned collar edges 84 and 86 respectively. Together the concentric edges 84, 86 define an annular slot 88. The slot 88 is continuous and of uniform width except for the intrusion of the feed flights 54 whose downstream ends 90 extend through the slot 88 and whose outer edges 92 approximately radially bisect it.

Figure 4:
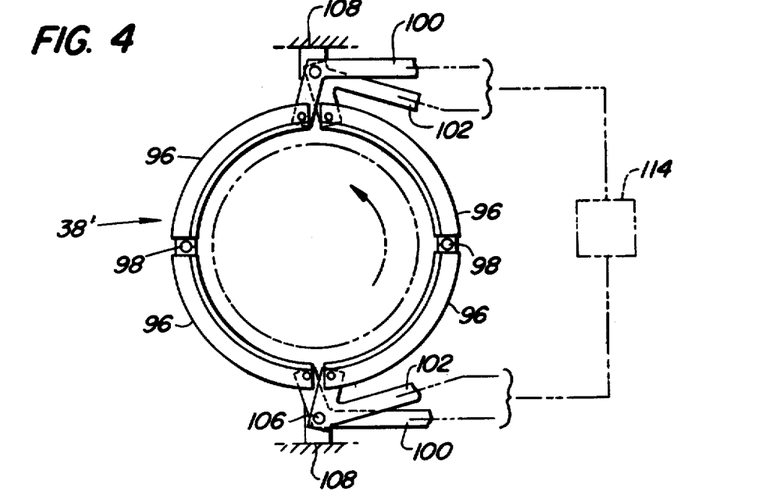
FIG. 4 is a schematic reduced partial front view of the separator suggesting a linkage and articulating means for providing approximately concentric radial adjustment of the outer stone collar.

A means of providing radial adjustment of an outer stone collar 38' is indicated in FIG. 4. The collar 38' has been divided into four equal arcuate portions 96, these are coupled together in pairs by pivots 98 and each pair is supported at its opposite ends by first and second linkage members 100, 102. The linkage members share first and second fixed common pivots 104, 106, carried by the combine frame 108. The geometry of the arrangement is such that actuation of the linkage members 100, 102, results in radial movement of the collar portions 96 towards or away from the rotor collar 58 and maintaining an approximately concentric relationship with it. An adjusting arrangement of this type is described in more detail in U.S. Pat. No. 4,330,000, Peiler, also assigned to the assignee of the present invention and hereby incorporated by reference.

The setting of the adjustable collar 38' may be controlled by manual manipulation of the linkage members or it may be controlled automatically, responsive to the detected presence upstream of the stone control slot 88 of a stone or other foreign body falling within a certain predetermined size range. A possible automatic control arrangement is illustrated schematically in the block diagram of FIG. 7. In this exemplary arrangement, one or more sensors 110, for example of the piezoelectric type, are positioned in the floor of the feeder house 12'. A sensor application of this type is described in U.S. Pat. No. 3,805,798 Girodat, hereby incorporated by reference. A signal from the sensor 110, indicating the passage of a potentially damaging stone through the feeder house, is processed by a signal processor 112 and forwarded to energize an actuator 114 connected so as to close down the casing collar 38' and establish a predetermined setting for the stone arresting annular slot 88'. The control system is such that the stone control device moves into its "closed" operating mode immediately on receiving a signal from the sensor in the feeder house. It remains closed, controlled by a timer, long enough for the stone which originated the signal, to be ejected from the separator. Essentially, under this automatic control, the stone control system moves between first and second operating modes, in which the annular slot is set at wider and narrower settings, respectively, for arresting stones greater than particular first and second sizes—as is discussed further below.

In operation, the combine advances into a field of crop and gathered crop material is delivered to the infeed portion of the separator by the feeder house 12. The rotor 20, with its feed flights 54 and the casing 18 with its guide vanes 32 and 34, cooperate to propel the received crop material rearwardly in a generally spiral path in the annular space between rotor and housing in the usual way. The crop material may contain stones of various sizes. The radial width of the annular slot 88 has been chosen to allow the passage downstream into the processing portions of the separator only of stones considered small enough to cause no important damage to the separator. The axially downstream movement of larger stones, under the influence of the feed flights 54, is arrested at the gate formed by the inner and outer collars, 58 and 38 respectively. Stones too large to pass through the gate (slot 88) will generally be of such a size that they will be engaged by the feed flight 54 and propelled circumferentially in the stone track 36 until they reach the stone track outlet 40. Centrifugal force will cause the stone to ride on the surface of the stone track 36 until it reaches the leading edge 46 of the stone track outlet 40. There, the stone is released by the separator rotor, being projected tangentially and circumferentially from the rotor into the stone sump 14. The off-setting of the top wall 62 of the sump and the presence of the wall step portion 70 facilitate the release of the stone from the separator casing and its passage into the stone sump 14. The capacity of the sump allows a substantial number of stones to be collected, requiring only occasional emptying. The easily latched and unlatched door 72, lying in the outside wall 16 of the combine makes this a simple and convenient operation for the operator of the combine.

Operation of a stone control device according to the invention depends, first of all, upon ejection of the stone from the separator casing under centrifugal action generated by propulsion of the stone by the rotor. However, a simple outlet in the casing does not by itself provide a satisfactory solution. Axial movement tends to dominate, requiring an outlet to have unacceptably large dimensions to be sure of a satisfactory level of stone rejection. For efficient stone control therefore, the axial movement of the stone is arrested by a circumferentially extending stone collar or collars 38, 58 defining a gate or slot 88 of limited radial extent. This gate determines not only the maximum size of stone which will be passed into the processing portions of the separator but also serves as a guide or control surface against which the circumferential movement of the stone may continue until the preselected exit zone of the separator casing is reached where the stone may exit tangentially through the outlet 40 provided.

In the present embodiment, the stone collar is located closely adjacent the upstream end of the threshing section of the separator. Given that the stone control device, by creating a particular restriction, contributes to an attenuation or reduction in radial thickness of the crop material mat, a change which must occur at entry into the threshing section anyway, it is efficient to position the stone collar here, where it is generally compatible with the transition from feeding to processing. It is also convenient to locate the stone control device relatively downstream in the infeed section of the separator to be clear of the feeder house separator casing transition and preferably where the casing has assumed a cylindrical form. However, although there are obvious advantages, in a cylindrical casing with a concentric stone collar arrangement, arrangements departing somewhat from the cylindrical end concentric are within the scope of the invention. It is only necessary that the "gate", although preferably of uniform radial extent, be dimensioned so as to be effective in arresting the axial passage of stones above a predetermined maximum size. Eccentricity or departure from the circular are also tolerable as long as it is still possible for there to be a substantially smooth track immediately upstream of the stone collar for the generally circumferential propulsion of the stone as far as necessary to reach the outlet in the casing.

Given that the stone collar positively arrests the stone and provides for its circumferential propulsion prior to ejection, the width (axial extent) of the casing outlet need be only somewhat greater than the maximum stone size which the feeding system is designed to accept up to this point. However, a broad objective of the stone control device, to be considered in determining outlet size and proportions, is to eject the maximum number of stones after the fewest revolutions within the casing and with the least breakage of stones. Other, somewhat conflicting, considerations include: minimizing the size of the outlet so as to minimize the increase in power consumption due to the relative increase in friction of crop material passing over the outlet; locating the outlet in a quadrant of the casing with a minimum concentration of crop material (this depends on the overall configuration of the infeed portion of the separator and the direction of rotation of the rotor); and convenience of emptying the stone sump. FIGS. 1 and 2 show an outlet 40 design which represents a satisfactory accommodation of these various objectives and criteria. The outlet 40 has a relatively narrow axial extent of about 150 millimeters and extends over about 70 degrees of arc and is placed in an upper quadrant of the separator casing so that the flow of material past it and into it is generally downwards. This facilitates the use of a simple sump or stone box 14 form, communicating directly with an outer wall 16 of the combine. Preferably, the arcuate extent of the outlet is of the order of 60 to 90 degrees.

The invention lends itself to realization over a wide range of dimension and configuration. The following additional particular details are given partly as an example of dimensions and proportions which have performed successfully and partly to facilitate discussion of relationships. In a separator with a rotor diameter of the order of 400 to 700 millimeters, guide vanes 32, 34 of 25 millimeters radial height and a 25 millimeter annular space (clearance) between guide vanes and threshing bars, a nominal 50 millimeter annular slot 88 or gate has been successfully used. In operating conditions where the stone problem is moderate to severe, it has been found advantageous to define an annular slot 88 somewhat inset from the inside wall of the separator casing by using an outer collar 38, carried by casing, of 25 millimeters height. An inner collar 58 carried by the body of the rotor extends about 50 millimeters radially above the body of the rotor. The outer edge of the rotor feed flight 54 approximately bisects the annular slot 88. The stone track 36 immediately upstream of the stone collar is approximately 150 millimeters wide to be compatible with the outlet 40.

The annular slot 88 of the stone collar may be considered the third "gate" in a three-stage stone management or control system of the combine harvester. The first gate is the combine gatherer which may accept and convey quite large stones, larger than say our exemplary 150 millimeters nominal size. The second gate may be an element of the feeder house or feeder system (not shown in the drawings) designed to accept and forward stones no greater than 150 millimeters nominal diameter. Control may be by means of slipping a clutch in the feeder house drive system or ejection by other known conventional means. It follows that the material-handling system between the second gate (feeder house device) and the third gate (separator stone collar) must be capable of handling stones up to 150 millimeters nominal size throughout its length including entry into the stone track area and immediately ahead of the stone collar and entry into the stone sump itself. Stones smaller than 50 millimeters nominal size pass through the annular slot 88 of the stone collar and are handled without important damage by the downstream portions of the separator.

Provision of stone control may detract from the material-handling capacity of a given feeding and conveying system. Adoption of a multi-stage system such as the three-stage system just described, offers a practical compromise between the conflicting demands of stone control and material handling. In particular, placing the "third stage" or final stone control device of the invention downstream, immediately ahead of the sensitive areas of the separator, postpones its intrusion into the crop material mat until the mat is already partially attenuated so that the potential effect on material-handling capacity and power consumption is minimized.

It is important, especially in the stone collar area of the separator, to use component configurations which do not offer wedging opportunities for stones. One possibility for wedging occurs in the rearwardly converging annular slot 88 defined by the inner and outer collars when the frusto-conical or chamfered form shown in the drawings, is used. Again, there is conflict—a less oblique chamfer making for smoother material handling but increasing the likelihood of wedging. Among the compromise solutions available is that indicated in FIG. 5 where the slope (82) of the outer collar 38 has been maintained a relatively gentle angle while a simple flat annular form 120 has been adopted for the inner collar (shown in phantom outline only). Tendency for wedging of stones may be reduced by axially offsetting the inner and outer collars as shown in the alternative embodiment of FIG. 6. The direction of offset shown in the figure has the additional potential advantage of easing the passage of stones from the stone track 36 into the stone sump.

Another stone wedging opportunity occurs at the junction between the feed flight 54 and the inner stone collar 58. An acute wedging angle between the contiguous surfaces of the stone collar and the feed flight can be avoided by suitable choice of the angle of the surface of the stone collar and by minimizing the helix angle of the feed flight at the junction between the two.

Figure 8:
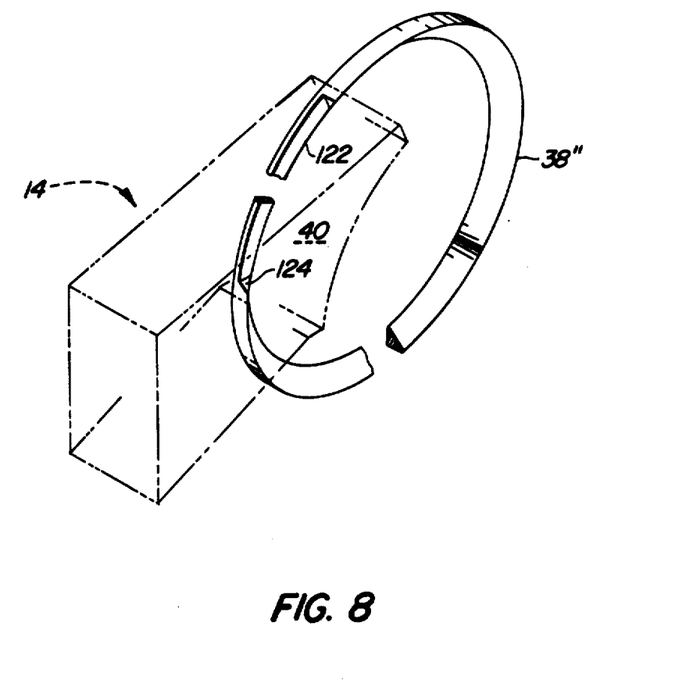
FIG. 8 is a schematic partial perspective view of an alternative outer stone collar.

Another consideration affecting the design of the stone collars is the possibility, in some applications, for the entry of a stone into the sump 14 to be delayed by its riding on the sloping face 82 of the collar 38. The alternative collar form 38" shown in FIG. 8 represents a useful, at least partial, resolution of this problem. The portion 122 of the collar spanning the stone sump 14 is modified to a simple flat annular form (similar to the inner collar 120) with a suitable transition at 124 to help maintain a smooth flow of material.

Figure 5:
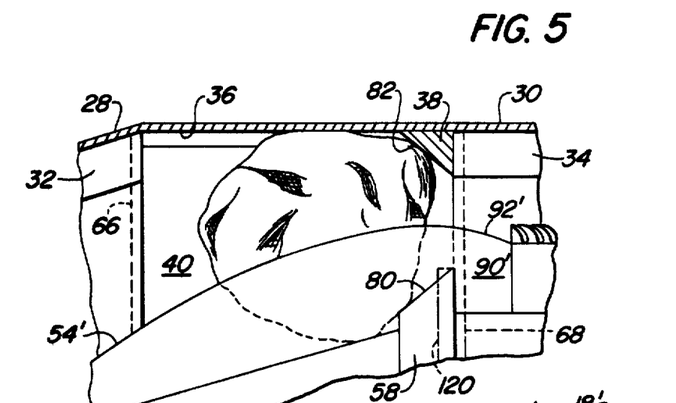
FIG. 5 is a view similar to FIG. 3 showing an alternative treatment of the feed control flight adjacent the stone collars.
Figure 6:
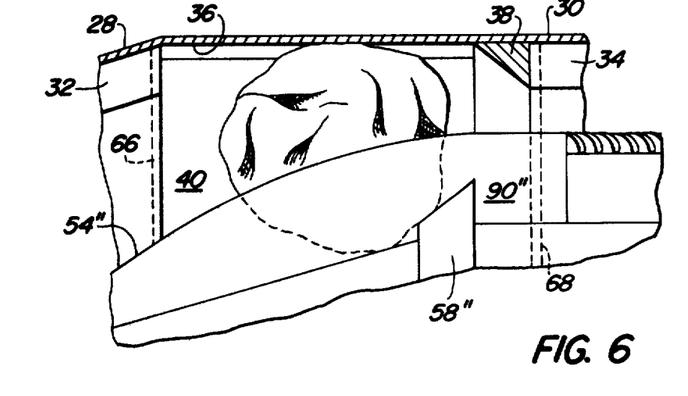
FIG. 6 is a view similar to FIG. 3 showing an alternative embodiment of the invention in which the stone collars are axially offset one from another.

While it has been found that stone control arrangements according to the invention may be introduced into a given separator without substantially affecting material-handling capacity, there is generally an increase in power consumption. This can be minimized by careful control of relationships between functional surfaces at the stone collar. Increase of power consumption comes partly from the "pinching" of crop material between the outer edge (92) of the feed flight (54) and the outer stone collar 38 or the casing. Therefore, the radial clearance between the feed flight and the outer collar or the separator casing should be kept as great as possible while still providing adequate indexing paddle area for propulsion of stones in the stone track by that portion of the feed flight. A regular feed flight form 54, in which the outer edge of the flight 92 approximately bisects the annular slot 80 and is radially coincident with the threshing bar 56, as shown in FIG. 3, has performed acceptably. An alternative form in which the height of the feed flight 54' is reduced from just upstream of the stone collar is shown in FIG. 5. Here, adequate indexing paddle area has been maintained while reducing still further the pinch-point effect between flight edge portion 92' and outer collar 38 compared with FIG. 3.

The feed flights of both FIGS. 3 and 5 extend downstream beyond the stone collar. The extension 90, 90' or axial overlap is sufficient to maintain positive control of crop material through the stone collar slot 88 and beyond so as to maintain material-handling capacity and maintain the smoothest possible flow at the collar so as to reduce relative power increase. The downstream end of the feed flight (90, 90') is contiguous with the upstream end of the threshing bar 56 as is already known and typical.

Making the radial width of the stone collar annular slot 88 adjustable makes it possible to reduce the power comsumption cost of the device as well as setting it to suit particular operating conditions. In the embodiment shown, the outer collar 38' has been made adjustable and as indicated in FIG. 3, it may be retracted so that its inner edge 86 is at least flush with the inner surface of the separator casing. To continue the exemplary dimensions introduced above, this retraction may be of approximately 25 millimeters measured radially so that the annular slot width becomes effectively 75 millimeters, a gate size which may be quite suitable for harvesting corn. The risk of gathering stones is rather lower with the cornhead than with the typical small grain platform and even 75 millimeter stones may be tolerated by the separator downstream of the stone collar. And of course, the gap must be adequate for the passage of corn ears into the threshing zone.

Figure 7:
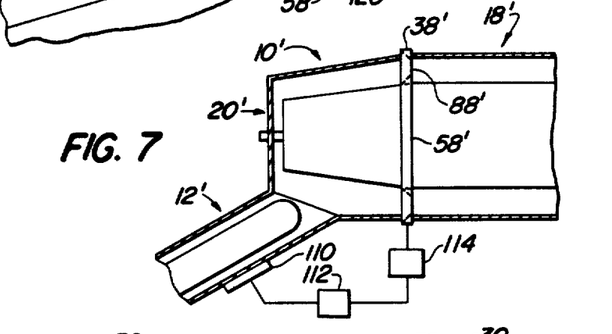
FIG. 7 is a schematic side view of an automatic control arrangement for the stone control device.

Obviously, the power comsumption penalty imposed by the stone collar device can be minimized by operating with the stone collar slot or gate 88 set no narrower or closer than conditions demand. In the case of manual control of stone collar adjustment, this amounts to simply setting the device at the widest acceptable setting for the conditions and leaving it in that setting until conditions change. Automatic control of the stone collar, as illustrated in FIG. 7, is even more advantageous. As described above, in automatic operation the stone collar slot may remain wide open (or at a first, wider setting) until the detected presence of a stone in the feeder conveyor system (12') ahead of the stone collar, signals for the collar to be closed. In the embodiment illustrated and described, the stone collar 38' would be operating between a narrow setting and a wide setting but always offering a measure of stone protection. Although not shown in the drawings, it is clear that means such as a simple internal linkage adjustment arrangement would make it possible to vary the specific annular slot width settings offered by the automatic control.

Stone control devices according to the invention have numerous good qualities and offer several specific advantages over other known so-called stone traps. In a basic nonadjustable configuration, the present invention is extremely simple and involves no moving parts. It is a passive design, using only available energy for its function. Its operation is continuous and automatic and not interrupted by detection and ejection of individual stones and, of course, there is no resetting required after stone ejection. Presence of such a stone control device has little effect on material-handling capacity—it introduces no alien function into the system. Unlike other known stone traps, through the use of the precise annular slot, it both positively and directly discriminates and ejects by size.

We claim:

1. In an axial flow rotary crop material separator in which a rotor rotates within a casing so as to define an annular space, the space having an upstream inlet end for receiving harvested crop material, which material may include nonfrangible bodies, and a downstream outlet end for discharging at least a portion of the received material and in which rotor and casing cooperate to propel the received material downstream as a mat in a generally spiral path, the speed of the rotor being sufficient to maintain the mat generally in contact with the casing, a rock control arrangement comprising:

means disposed in the annular space between the inlet and the outlet for arresting the downstream progress of nonfrangible bodies having dimensions greater than a predetermined minimum;

an aperture in the casing adjacent to and at least partially upstream of the means for arresting, for passing said bodies larger than the predetermined minimum; and     means carried by the rotor for propelling the bodies within the casing to bring them into register with the aperture and release them to pass through the aperture under the action of centrifugal force.

2. The stone control arrangement of claim 1 wherein the means for arresting defines a continuous annular slot having a radial width and lying in a plane approximately perpendicular to the separator longitudinal axis.

3. The stone control arrangement of claim 2 wherein the annular slot is of uniform radial width.

4. The stone control arrangement of claim 2 wherein at least one portion of the arresting means defining the annular slot is generally radially and concentrically adjustable so as to vary the width of the slot.

5. The stone control arrangement of claim 2 wherein the means for arresting comprises inner and outer annular collars and the outer collar is radially adjustable through an adjustment range, that range including a position in which the inner edge of the collar is flush with the inner wall of the casing.

6. The stone control arrangement of claim 2 wherein the means for arresting comprises inner and outer annular collars carried respectively by the rotor and the casing and wherein the separator comprises an upstream feed portion adjacent the inlet and a downstream processing portion approximately contiguous with the feeding portion and the annular collars are disposed adjacent the junction of the feeding and processing portions.

7. The stone control arrangement of claim 6 wherein, adjacent said junction, the processing portion includes material control members carried by the casing and rotor respectively, defining between them a radial clearance and said radial clearance is less than the width of the annular slot.

8. The stone control arrangement of claim 6 wherein the rotor carries a generally helically disposed raised material control member, said member including a portion extending axially downstream of the rotor collar.

9. The stone control arrangement of claim 8 wherein the material control member has a radially outward boundary and the radial disposition of said boundary is comparatively reduced in the immediate vicinity of the annular slot.

10. The stone control arrangement of claim 6 wherein the rotor feed portion includes a generally helically disposed raised material control member terminating adjacent and downstream of the rotor collar.

11. The stone control arrangement of claim 2 wherein the means for arresting comprises inner and outer collars carried by the rotor and casing respectively and defining said annular slot and said slot has an axial extent and the radial width of the slot decreases in a downstream direction.

12. The stone control arrangement of claim 2 wherein the means for arresting comprises inner and outer collars carried by the rotor and casing respectively each collar presenting a relatively narrow edge, said edges concentrically defining the shot and lying in a plane approximately perpendicular to the axis of the separator rotor.

13. The stone control arrangement of claim 2 wherein the rotor includes a core portion of generally circular cross section and wherein the respective collars extend towards each other, radially inwards from the inner surface of the casing and radially outwards from the rotor core, and wherein the radial extent of the rotor collar is greater than that of the outer collar.

14. The stone control arrangement of claim 1 wherein the arresting means includes an annular collar generally concentric with the casing and having an inner edge normally inset radially from the inner wall of the casing.

15. The stone control arrangement of claim 14 wherein the casing carries internal material control members, closely adjacent and downstream of the annular collar, and the radial height of said members is no greater than that of the collar.

16. The stone control arrangement of claim 14 wherein the means for arresting further comprises an inner stone collar carried by the rotor so as to define in cooperation with the outer collar, an annular slot of substantially uniform width.

17. The stone control arrangement of claim 16 wherein said collars are offset axially one from another.

18. The stone control arrangement of claim 16 wherein the width of said slot is greater than the width of the radial inset of the outer collar from the wall of the casing.

19. The stone control arrangement of claim 14 wherein the aperture in the casing is generally circumferentially extending and has spaced apart upstream and downstream edges and wherein the outer collar is approximately aligned with the downstream edge.

20. The stone control arrangement of claim 1 wherein the arresting means includes a raised annular collar carried by the rotor.

21. In an axial flow rotary crop material separator for a combine, the combine having a generally upright body wall and the separator having a generally cylindrical casing with a rotor carried generally concentrically within it so as to define an annular space between rotor and casing, said space having an upstream inlet and a downstream outlet and including material control elements so that as the rotor rotates, material received at the inlet is propelled in a mat generally in contact with the casing under the action of centrifugal force in a generally spiral path within the annular space to the outlet, a stone control arrangement for controlling stones ingested with the crop material comprising:

means for reducing the effective radial extent of the annular space, disposed between the inlet and the outlet so as to define an annular slot;

an outlet in the casing adjacent the annular slot; and means carried by the rotor for propelling stones failing to pass through the annular slot generally circumferentially in the direction of the outlet.

22. The stone control arrangement of claim 21 wherein the outlet in the casing is defined by generally circumferentially extending spaced apart upstream and downstream edges and limited circumferentially by respective leading and trailing edges.

23. The stone control arrangement of claim 21 and further including a stone receiving box external to the casing and communicating directly with the outlet for receiving and holding stone passing through the outlet.

24. The stone control arrangement of claim 23 wherein the outlet is defined at least partially by circumferentially spaced and, with respect to the direction of rotor rotation, leading and trailing edges and wherein the receiving box includes a top wall extending somewhat tangentially and disposed generally radially outward of the outlet and having an inner end and further including a short offset wall extending generally radially between the leading edge and the inner end of the top wall of the box.

25. The stone control arrangement of claim 24 wherein the offset wall is disposed adjacent top dead center of the casing.

26. The stone control arrangement of claim 23 wherein the stone receiving box extends generally radially outwards and includes an outer wall adjacent the combine body wall.

27. The stone control arrangement of claim 26 wherein the outer wall of the box includes a door, said door being openable to permit removal of collected rocks and accessible externally of the combined body wall.

28. The stone control arrangement of claim 21 wherein, by virtue of the particular direction of rotation of the rotor, crop material is moving generally upwards on one side of the casing and downwards on the other side and wherein the outlet is disposed in a portion of the casing where crop material movement is at least partially downwards.

29. The stone control arrangement of claim 28 wherein the outlet is disposed in an upper quadrant of the casing.

30. The stone control arrangement of claim 28 wherein the circumferential extent of the outlet is more than about 90 degrees of arc of the casing.

31. The stone control arrangement of claim 21 wherein the material control members include members of axial extent carried on the inner surface of the casing including members upstream of the annular space reducing means and wherein the inner surface of the casing includes a substantially smooth circumferentially extending stone track embracing the outlet and said track has an upstream boundary defined by the termination of the upstream material control members.

32. The stone control arrangement of claim 31 wherein the axial extent of the stone track is equal to approximately at least twice the radial extent of the reduced annular space.

33. The stone control arrangement of claim 21 wherein the material control members include members carried by the rotor including at least one member extending axially so as to span substantially the stone track of the casing.

34. The stone control arrangement of claim 21 wherein the material control elements include an element carried by the rotor and at least at one of said elements extends axially upstream and downstream of the means for reducing the annular space.

35. The stone control arrangement of claim 21 wherein the means for reducing the annular space includes an annular stone collar carried by the rotor and said stone collar includes a tapered surface concentric with the rotor and increasing in external diameter in a downstream direction.

36. The stone control arrangement of claim 21 wherein the means for reducing the annular space includes an annular stone collar carried by the casing and said stone collar has an axial width and includes a tapered surface concentric with the casing and decreasing in internal diameter in a downstream direction.

37. The stone control arrangement of claim 36 wherein the collar spans a downstream portion of the aperture and the tapered surface is interrupted so that, at the aperture, the axial extent of the collar is reduced so as to facilitate passage of stones through the aperture.

38. In a combine harvester having an axial flow rotary separator and a power source and means including a feeder house for gathering crop material from a field and feeding it to the separator, the separator having a generally cylindrical casing with a rotor carried generally concentrically within it so as to define an annular space between rotor and casing, said space having an upstream inlet and a downstream outlet and including material control elements so that as the rotor rotates, material received at the inlet is propelled in a mat generally in contact with the casing under the action of centrifugal force in a generally spiral path to the outlet, a stone control arrangement for controlling stones ingested with the crop material comprising:

means for reducing the effective radial extent of the annular space so as to define an annular slot, disposed between the inlet and the outlet;

an aperture in the casing adjacent to and upstream of the annular slot;

means carried by the rotor for propelling stones failing to pass through the annular slot, generally circumferentially in the direction of the aperture;

sensor means disposed in the feeding system for generating a signal responsive to the presence of stones exceeding a predetermined minimum size; and control means connected to the power source and between the sensor and the annular space reducing means and operative to adjust said means, responsive to the stone sensing signal.

39. The stone control arrangement of the claim 38 wherein the means for reducing the annular space includes an annular stone collar carried by the casing and wherein the adjustment of said annular space reducing means comprises radial and generally concentric displacement of said annular collar.

40. The stone control arrangement of claim 39 wherein the automatic response of the control means to a stone sensing signal includes moving the annular collar generally concentrically and radially inwards from a first position to a second position.

* * * * *